United States Patent
Li (10) Patent No.: US 7,541,695 B2
(45) Date of Patent: Jun. 2, 2009

(54) UNINTERRUPTIBLE POWER SUPPLY WITH LOW POWER LOSS

(75) Inventor: Chia-Hsiang Li, Taoyuan (TW)

(73) Assignee: Delta Electronics, Inc., Taoyuan Hsien (TW)

(*) Notice: Subject to any disclaimer, the term of this patent is extended or adjusted under 35 U.S.C. 154(b) by 258 days.

(21) Appl. No.: 11/745,895

(22) Filed: May 8, 2007

(65) Prior Publication Data
US 2007/0262650 A1 Nov. 15, 2007

(30) Foreign Application Priority Data
May 9, 2006 (TW) .............................. 95116457 A (51) Int. Cl.
*H02J 7/00* (2006.01)
*H02M 3/335* (2006.01)
(52) U.S. Cl. .......................................... 307/66; 363/97
(58) Field of Classification Search ................... 363/16, 363/17, 95, 97, 131, 132; 307/64, 66, 85, 307/86, 113, 125, 126, 130
See application file for complete search history.

(56) References Cited

U.S. PATENT DOCUMENTS

| | | | | |
|---|---|---|---|---|
| 6,218,744 | B1 * | 4/2001 | Zahrte et al. | 307/64 |
| 6,348,782 | B1 * | 2/2002 | Oughton et al. | 323/284 |
| 6,400,043 | B1 * | 6/2002 | Batson et al. | 307/66 |
| 6,753,622 | B2 * | 6/2004 | Oughton, Jr. | 307/64 |

* cited by examiner

*Primary Examiner*—Matthew V Nguyen (57) ABSTRACT

Disclosed is an uninterruptible power supply including a controller; a first switch circuit; a second switch circuit; a transformer having a first winding connected to a load and the first switch circuit and a second winding connected to the second switch circuit; an energy accumulation device; a DC-DC converter for boosting a DC voltage outputted from the energy accumulation device; an inverter for converting a boosted DC voltage into a first AC voltage and delivering the AC voltage to the first winding. When the energy accumulation device is supplying power, the second winding generates a second AC voltage in response to the first AC voltage, thereby the second AC voltage can regulate the voltage level of the first AC voltage which is delivered to the load according to the connection status between the second switch circuit and the second winding.

20 Claims, 8 Drawing Sheets

UNINTERRUPTIBLE POWER SUPPLY WITH LOW POWER LOSS

FIELD OF THE INVENTION

The present invention is related to a power supply, and more particularly to an uninterruptible power supply.

BACKGROUND OF THE INVENTION

The uninterruptible power supply (or UPS) is an emergent power supply device connected between a power source and a load, in which the power source can be a commercial AC power supply or any other AC power source. The purpose of an UPS is to ensure the normal operation for a load device when the power source is malfunctioned or becomes abnormal.

Figure 1A:
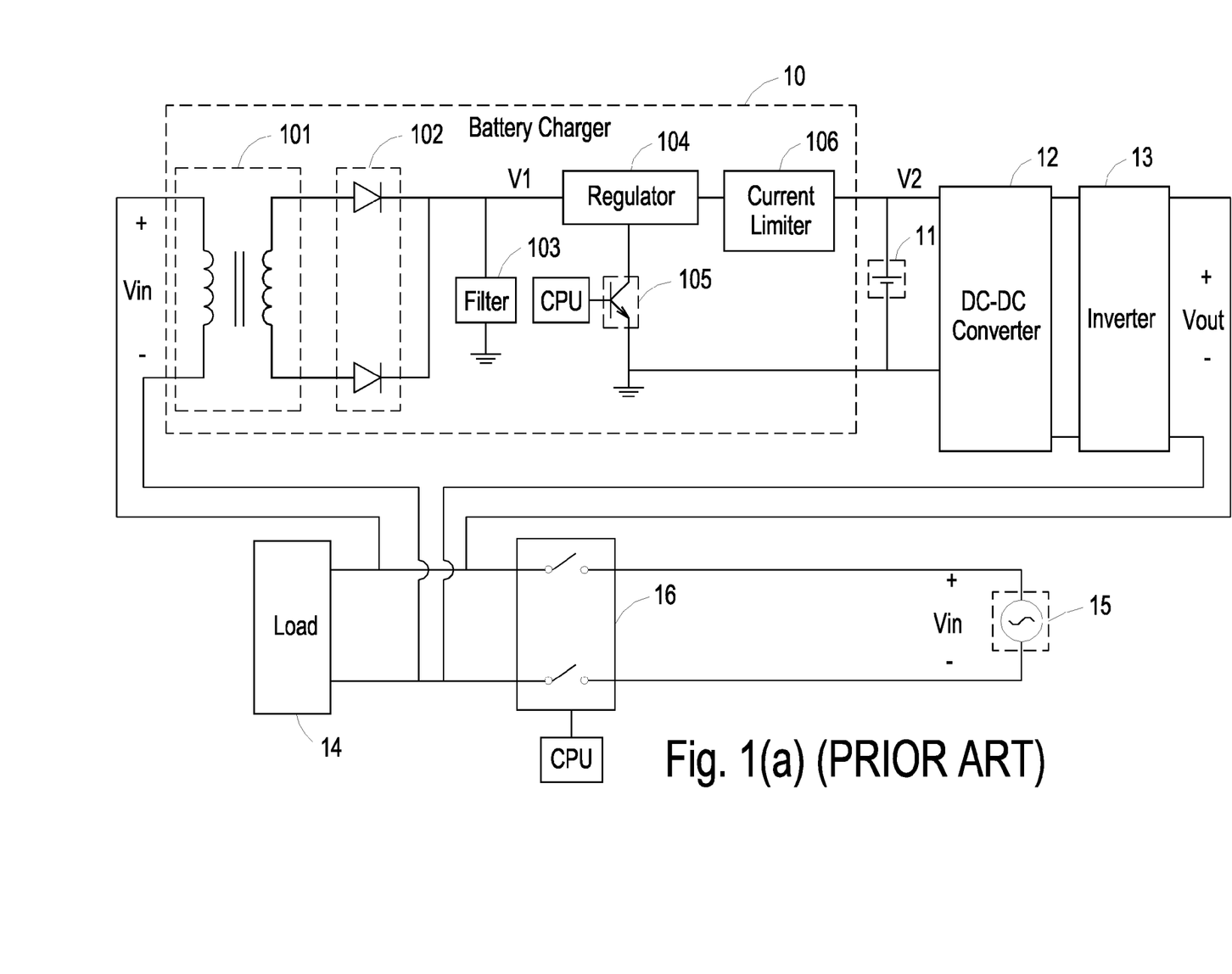
FIG. 1(a) shows a circuit block diagram of a conventional uninterruptible power supply.

FIG. 1(a) shows a circuit block diagram of a conventional uninterruptible power supply. The uninterruptible power supply as shown in FIG. 1(a) includes a battery charger 10, a battery module 11, a DC-DC converter 12, an inverter 13, and a switch circuit 16. The uninterruptible power supply of FIG. 1 is configured to deliver the electric power received from a commercial power supply 15 to a load 14, or deliver the electric power obtained from the conversion of the electric power outputted from the battery module 11 to the load 14 when the commercial power supply 15 becomes abnormal. The battery charger 10 includes a transformer 101, a rectifier 102, a filter bank 103, a voltage regulator 104, a switch 105, a CPU and a current-limiting device 106.

When the commercial power supply 15 is operating normally, the CPU enables the switch circuit 16 to be connected to the commercial power supply 15 so that the AC voltage Vin is delivered to the load 14 for powering the load 14. Also, the AC voltage Vin is delivered to the transformer 101 of the battery charger 10 to undergo a down-conversion process so as to be converted into an AC voltage with a lower voltage level. The converted AC voltage is rectified into a DC voltage through the rectifier 102 and the resultant DC voltage is processed to filter its noise and ripple through the filter bank 103, so as to obtain a stable DC voltage V1.

The voltage regulator 104 is connected to the switch 105 which is manipulated by the CPU for regulating the input voltage of the battery module 11. The current-limiting device 106 is connected to an output terminal of the voltage regulator 104 and an input terminal of the battery module 11 for limiting a maximum value of a charging current for the battery module 11.

When the commercial power supply 15 is abnormal, the CPU manipulates the switch circuit 16 to turn off and enables the battery module 11 to supply power. The DC voltage Vout outputted from the battery module 11 is boosted through the DC-DC converter 12, and the boosted DC voltage is delivered to the inverter 13. The inverter 13 is configured to convert the boosted DC voltage into an AC voltage and deliver the AC voltage the load 14.

Figure 1B:
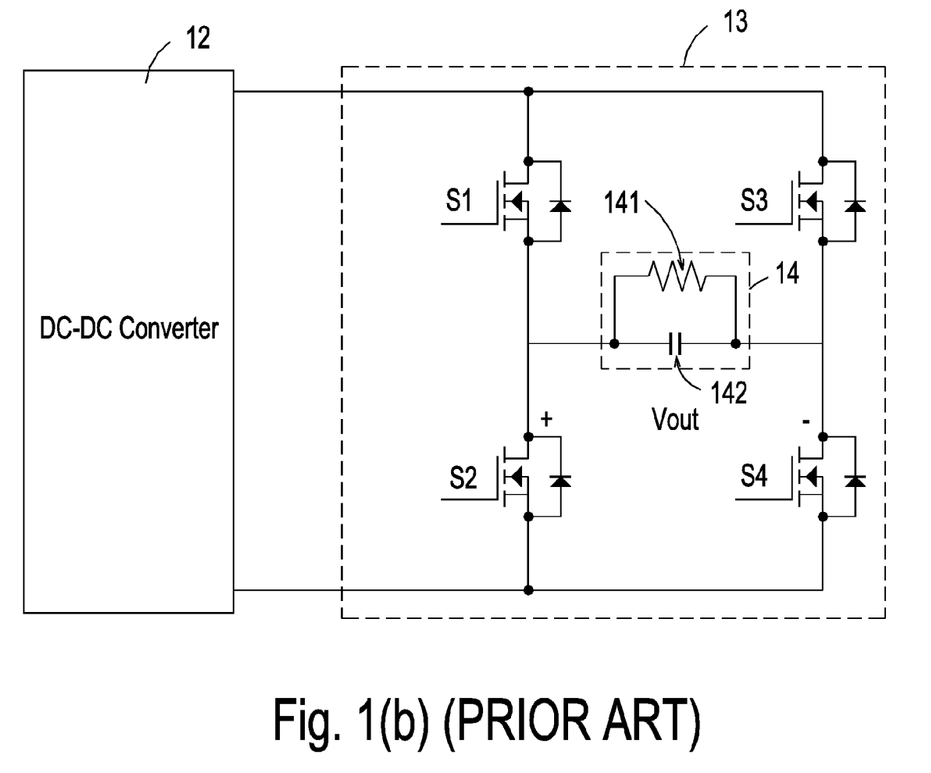
FIG. 1(b) shows a circuit block diagram of the inverter of FIG. 1.

Generally speaking, the AC voltage outputted from the inverter 13 within the conventional uninterruptible power supply has a square waveform or a sinusoidal waveform under the Battery-Backup mode. As shown in FIG. 1(b), a circuit block diagram of the inverter 13 of FIG. 1 is illustrated. In FIG. 1(b), one end of inverter 13 is coupled to the DC-DC converter 12 and the other end of the inverter 13 is coupled to the load 14. The load 14 is made up of a load resistor 141 and a load capacitor 142. The load 14 generally includes capacitive elements because the load 14 is a rectified RC load.

Figure 1C:
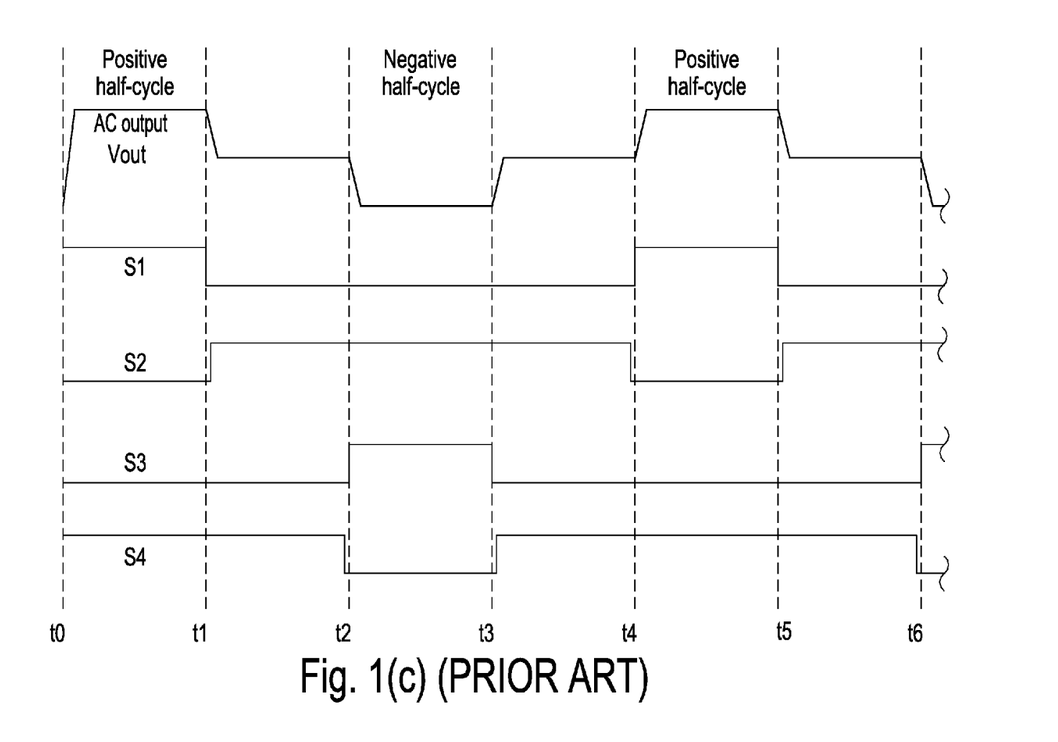
FIG. 1(c) shows a timing diagram illustrating a switching sequence of the switches S1, S2, S3, S4 located within the inverter of FIG. 1(b)

The inverter 13 includes four switches S1, S2, S3, S4. FIG. 1(c) is a timing diagram showing the switching sequence of the switches S1, S2, S3, S4. The voltage waveform of the AC voltage Vout generated across the load resistor 141 and the load capacitor 142 is generated by the switching mechanism of the switches S1, S2, S3, S4.

The switching mechanism of the switches S1, S2, S3, S4 is conducted in an alternate way between the positive half-cycles and the negative half-cycles. As an example, the switches S1 and S4 are turned on and the switches S2 and S3 are turned off during the positive half-cycle of the period of t0 to t1, and the switches S1 and S4 are turned off and the switches S2 and S3 are turned on during the negative half-cycle of the period of t2 to t3, and thereby generating an output AC voltage Vout across the load resistor 141 and the load capacitor 142. Because the inverter 13 employs an alternate switching mechanism to generate the AC voltage Vout between the positive half-cycles and the negative half-cycles, the voltage across the load resistor 141 and the load capacitor 142 must be zeroed at the point of transition from the positive half-cycle to the negative half-cycle and the point of transition from the negative half-cycle to the positive half-cycle, so that the switching loss of the inverter 13 can be minimized. However, the switching mechanism of the switches S1, S2, S3, S4 within the inverter 13 will force the load capacitor 142 to be charged and discharged during each half-cycle of the AC voltage. Therefore, at the point of transition from the positive half-cycle to the negative half-cycle or from the negative half-cycle to the positive half-cycle, the load capacitor 142 will be fully discharge to zero to prevent the output voltage with DC level if the resistance of the load resistor 141 is too large. A known solution to address these deficiencies is attained by allowing the switches S1 and S3 to turn on or allowing the switches S2 and S4 to turn on during the time interval between a positive half-cycle and a negative half-cycle, for example, the time interval of t1 to t2 or the time interval of t3 to t4. The switching mechanism of FIG. 1(c) allows the switches S2 and S4 to turn on to form a discharge loop among the load capacitor 142 and the switches S2 and S4, thereby the stored energy of the load capacitor 142 will be dissipated by the switches S2 and S4.

However, the aforementioned solution is prone to consume a great amount of power and arise the temperate of the switches S1, S2, S3, S4. Consequently, a large heat-dissipating device is required to be attached to the surface of the switches. Also, the dissipated energy normally implies the deterioration of the efficiency of the inverter, and the discharge time of the battery module will be shorter accordingly.

Figure 2:
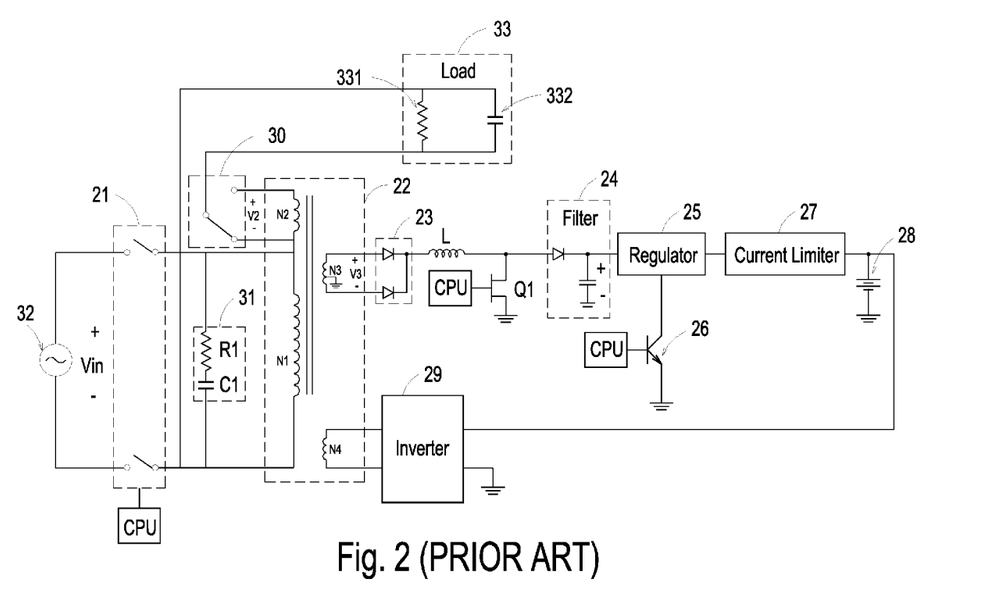
FIG. 2 shows another representation of a conventional uninterruptible power supply.

FIG. 2 shows another representation of a conventional uninterruptible power supply. As shown in FIG. 2, the uninterruptible power supply is made up of a first switch circuit 21, a transformer 22, a rectifier 23, a filter bank 24, a voltage regulator 25, a switch 26, a CPU, a current-limiting device 27, a battery module 28, an inverter 29, a second switch circuit 30 and a RC circuit 31. The uninterruptible power supply of FIG. 2 is configured to supply the power from the commercial power supply 32 to a load 33 or the power obtained from the conversion of the electric power stored in the battery module 28 to the load 33 when the commercial power supply 32 becomes abnormal. The transformer 22 is made up of a first winding N1, a second winding N2, a third winding N3 and a fourth winding N4, and the load 33 is made up of a load resistor 331 and a load capacitor 332.

When the commercial power supply 32 is operating normally, the CPU enables the first switch circuit 21 to be connected to the commercial power supply 32 so that the AC voltage Vin is connected to the load 33 and the winding N1. In the meantime, the first winding N1 serves as a primary winding, while the second winding N2, the third winding N3 and the fourth winding N4 collectively serve as a secondary winding assembly. The AC voltage Vin received by the first winding N1 is transferred to the secondary winding assembly through electromagnetic action so that the second winding N2 can output an output voltage V2 and the third winding N3 can output an output voltage V3.

The second winding N2 is provided with the capability of automatic voltage adjustment. The voltage connected to the load 33 is adjusted based on the connection status of the second switch circuit 30 so as to meet the specified operative voltage for the load 33. Therefore, the bad power supply voltage on the operation of the load 51 due to the over/under voltage condition occurred to the AC voltage delivered to the load 33 can be avoided.

The voltage V3 outputted from the third winding N3 is provided to charge the battery module 28 through a battery charger consisted of a rectifier 23, a choke L, a filter bank 24, a voltage regulator 25, a switch 26, and a current-limiting device 27, in which the choke coil is an optional device. The design norm and the operation theorem of the aforementioned circuit components within the battery charger have been described exhaustively in the above statements with reference to FIG. 1, and it is not intended to give details herein.

If the commercial power supply can not operate normally, the CPU manipulates the switch circuit 21 to turn off and enables the battery module 28 to supply power. The DC voltage from the battery module 28 is delivered to the inverter 29 and converted into an AC voltage to the fourth winding N4. The AC voltage received by the fourth winding N4 is transferred to the first winding N1 and the second winding N2 through electromagnetic action and boosted by the first winding N1 and the second winding N2. The voltage induced across the first winding N1 & the second winding N2 serve as the operative power for the load 33, and adjusted according to the connection status between the second winding N2 and the second switch circuit 30, thereby avoiding the bad output voltage on the operation of the load 33 due to the over/under voltage condition occurred to the voltage delivered to the load 33.

Although the circuitry of FIG. 2 is sufficient to solve the foregoing problems incurred with the circuitry of FIG. 1, some imperfections are still unresolved and need to be removed. For example, the transformer 22 that is taken as a voltage boosting elements for the uninterruptible power supply of FIG. 2 would produce a leakage inductance among the coil windings. Therefore, the transformer would release the energy stored in the leakage inductance when the internal switch (not shown) of the inverter 29 (not shown) transits from the turn-on state to the turn-off state. This would cause instantaneous spikes to the output voltage of the first winding N1. A known solution to remove the spikes occurred to the output voltage of the first winding N1 is to place a RC circuit 31 across the first winding N1 for suppressing the spikes occurred to the output voltage. Unfortunately, the RC circuit does little improvements to the suppression of the voltage spikes.

In addition, when the commercial power supply can not operate normally, the fourth winding N4 of the transformer 22 that serves as a voltage boosting device have to suffer large current variation. Therefore, the fourth winding N4 have to be manufactured by copper wires with a larger thickness. In this way, the overall size of the transformer would become very large and the copper wires would dissipate a great amount of energy, thereby deteriorating the efficiency of the uninterruptible power supply.

There is a need to develop an uninterruptible power supply that can tackle the foregoing problems and imperfections encountered by the prior art.

SUMMARY OF THE INVENTION

An object of the present invention is to provide an uninterruptible power supply with low power loss.

To this end, a broader aspect of the present invention is directed to an uninterruptible power supply being connected to a commercial power supply and a load having a capacitive element. The inventive uninterruptible power supply includes a controller; a first switch circuit electrically connected to the commercial power supply and the controller; a second switch circuit connected to the controller and one end of the load for performing switch operations in response to the driving of the controller; a transformer having a first winding, a second winding and a third winding, wherein the first winding is electrically connected to the other end of the load and the switch circuits and the second winding is electrically connected to the second switch circuit; a charging circuit electrically connected to the third winding; an energy accumulation device electrically connected to the charging circuit; a DC-DC converter electrically connected to energy accumulation device for boosting a DC voltage outputted from the energy accumulation device; an inverter connected to the DC-DC converter and the first winding for converting the boosted DC voltage outputted from the DC-DC converter into a first AC voltage and delivering the first AC voltage to the load. Under the mode that the energy accumulation device is supplying power, the controller manipulates the first switch circuit to turn off and the second winding induces a second AC voltage in response to the AC voltage delivered to the first winding, so that the second AC voltage can be used to regulate the magnitude of the first AC voltage delivered to the load according to the connection status between the second switch circuit and the second winding.

To this end, a broader aspect of the present invention is directed to an uninterruptible power supply being electrically connected to an input power and a load having a capacitive element. The inventive uninterruptible power supply includes a ground terminal; an energy accumulation device; a DC-DC converter electrically connected to the energy accumulation device; a controller for issuing a control signal; a filter/regulator circuit electrically connected to the energy accumulation device; a transformer having a first winding, a second winding and a third winding, wherein the first winding is electrically connected to the load; a rectifier electrically connected to the third winding; an inverter electrically connected to DC-DC converter and the first winding; an energy recycle converter electrically connected to the rectifier, the controller, the ground terminal and the filter/regulator circuit. Under the mode that the energy accumulation device is supplying power, the stored energy of the capacitive element of the load is delivered to the first winding by switch operation through the manipulation of the controller, so that the third winding induces a first voltage. The first voltage is discharged to the ground terminal through the rectifier and the energy recycle circuit for releasing the energy of the transformer. Also, the energy accumulation device can be charged by processing the first voltage with the rectifier and the filter/regulator circuit.

Now the foregoing and other features and advantages of the present invention will be best understood through the following descriptions with reference to the accompanying drawings, wherein:

DETAILED DESCRIPTION OF THE PREFERRED EMBODIMENT

A preferred embodiment embodying the features and advantages of the present invention will be expounded in following paragraphs of descriptions. It is to be realized that the present invention is allowed to have various modification in different respects, all of which are without departing from the scope of the present invention, and the description herein and the drawings are to be taken as illustrative in nature, but not to be taken as limitative.

Figure 3A:
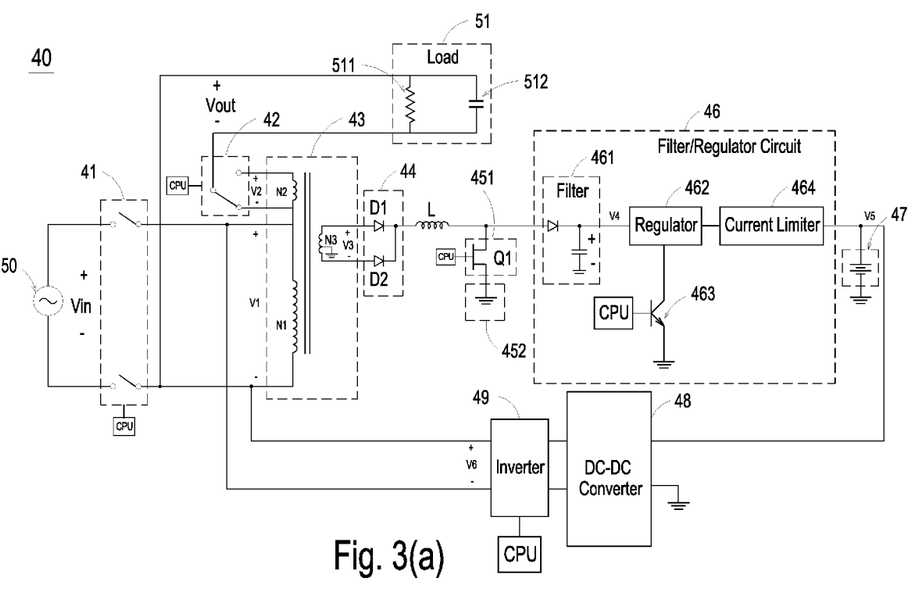
FIG. 3(a) shows a circuit block diagram of an uninterruptible power supply according to a preferred embodiment of the present invention.

FIG. 3(a) shows a circuit block diagram of an uninterruptible power supply according to a preferred embodiment of the present invention. As shown in FIG. 3(a), an uninterruptible power supply 40 is connected to a load 51 and configured to receive an AC voltage from a commercial power supply 50. The uninterruptible power supply 40 is made up of a first switch circuit 41, a second switch circuit 42, a transformer 43, an energy accumulation device 47, a DC-DC converter 48, an inverter 49, and a charging circuit consisted of a rectifier 44, a choke coil L, an energy recycle circuit 451, a ground terminal 452, a CPU, and a filter/regulator circuit 46. The uninterruptible power supply 40 is configured to deliver the electric power to the load 51 or deliver the electric power obtained from the conversion of the electric power outputted from the energy accumulation device 47 to the load 51 when the commercial power supply 50 is abnormal. The load 51 is made up of a load resistor 511 and a capacitive element 512 or a rectifying element. When the commercial power supply 50 is abnormal and the energy accumulation device 47 is enabled to provide the power for the load 51.

The transformer 43 is made up of a first winding N1, a second winding N2 and a third winding N3, wherein the first winding N1 serves as a primary winding, and the second winding N2 and the third winding N3 collectively serve as a secondary winding assembly. When the first winding N1 receives an AC voltage, the AC voltage is transferred to the secondary winding assembly through electromagnetic action so that the second winding N2 and the third winding N3 respectively induces an AC voltage. The first winding N1 is connected to the first switch circuit 41, the second switch circuit 42 and the inverter 49. The second winding N2 is provided with the capability of automatic voltage adjustment that is activated by adjusting the voltage provided to the load 51 through the connection status of the second switch circuit 42, and thus the voltage provided to the load 51 can comply with the specified voltage for the load 51. This may avoid the bad power supply to the operation of the load 51 due to the over/under voltage condition occurred to the AC voltage delivered to the load 51. The third winding N3 can be connected to the rectifier 44.

In the present embodiment, the rectifier 44 is implemented with a half-bridge rectifier or full-bridge rectifier that can rectify the AC voltage induced across the third winding N3 into a DC voltage. The rectifier 44 according to a preferred embodiment of the present invention is made up of a first diode D1 having an anode connected to one end of the third winding N3 and a second diode D2 having an anode connected to the other end of the third winding N3. The cathode of the first diode D1 is connected to the cathode of the second diode D2, both of which together serve as an output terminal for the rectifier 44. The CPU is configured to manipulate the energy recycle circuit 451, the switch device 463, the inverter 49, the first switch circuit 41, and the second switch circuit 42.

In the present embodiment, the filter/regulator circuit 46 is made up of a filter bank 461, a voltage regulator 462, a switch 463, and a current-limiting device 464. The energy recycle circuit 451 is a transistor switch having a first terminal connected to the filter bank 461 and a choke coil L, a second terminal connected to the CPU and a third terminal connected to the ground terminal 452. The energy recycle circuit 451 is manipulated by the CPU to release the energy stored in the choke coil L to the filter bank 461 so that the high-frequency harmonics of the DC voltage generated by the discharging of the choke coil L can be removed. Thus, a stable DC voltage V4 is obtained. Alternatively, the CPU can be set not to control the switching of the energy recycle circuit 451 so that the DC voltage outputted from the rectifier 44 can be delivered to the filter bank 461 in order to remove the high-frequency harmonics of the DC voltage. Thus, a stable DC voltage V4 is obtained. The choke coil L is used to enhance the effect of energy recycle.

The voltage regulator 462 is connected to a switch 463 that is manipulated by the CPU for regulating the voltage inputted into the energy accumulation device 47. The other end of the switch 463 is connected to a ground terminal. When the charging operation of the energy accumulation device 47 is completed, the CPU manipulates the switch 463 to turn on and shut down the voltage regulator 462, thereby stopping the charging of the energy accumulation device 47. On the contrary, the CPU manipulates the switch 463 to turn off and allow the DC voltage V4 to charge the energy accumulation device 47 through the voltage regulator 462 and the current-limiting circuit 464 until the charging of the energy accumulation device 47 is completed.

The current-limiting circuit 464 is connected to the output end of the voltage regulator 462 and the input end of the energy accumulation device 47 for limiting the maximum value of a charging current.

When the commercial power supply 50 is abnormal and the energy accumulation device 47 is responsible to supply the power for the load 51, the DC voltage V5 outputted from the energy accumulation device 47 is boosted by the DC-DC converter 48 and then converted into an AC voltage V6 by the inverter 49. The AC voltage V6 is delivered to the first winding N1 of the transformer 43, which means the voltage V1 across the first winding N1 is identical to the voltage V6, and thereby charging the load 51.

Figure 3B:
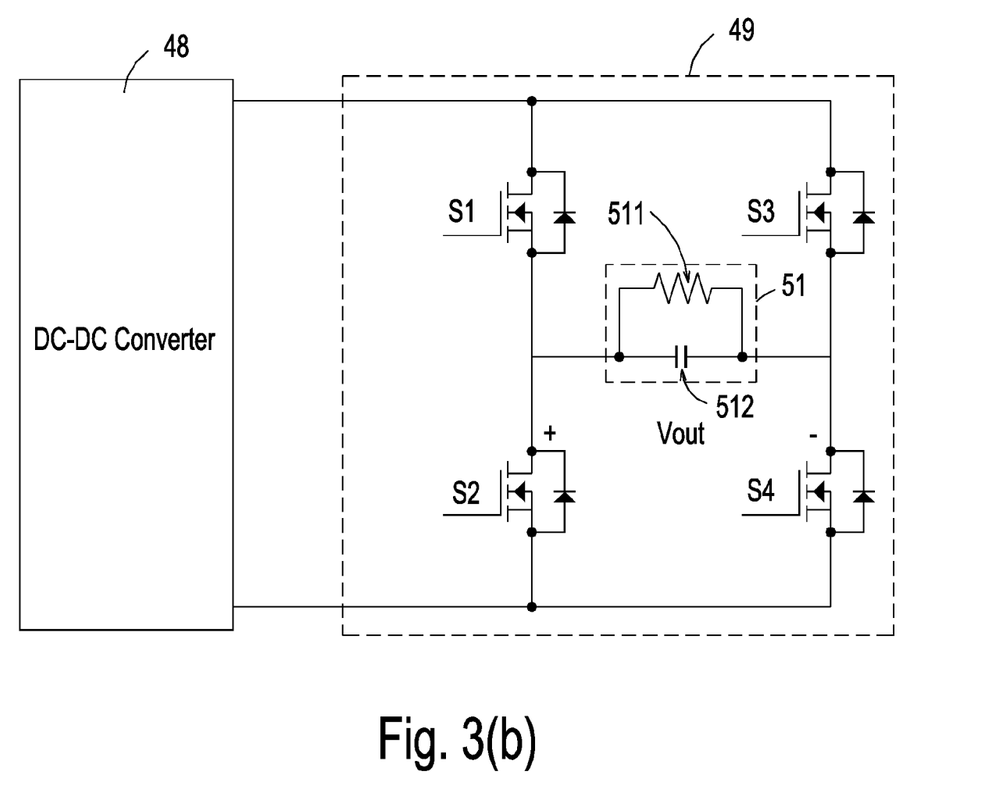
FIG. 3(b) shows a circuit block diagram of the inverter of FIG. 3(a)

The energy accumulation device 47 may be a battery, and the inverter 49 may include four switches S1, S2, S3, S4. Each switch is implemented with a MOSFET or similar transistor elements, as shown in FIG. 3(b). When the commercial power supply 50 is abnormal and the energy accumulation device 47 located within the uninterruptible power supply is supplying power, the inverter 49 manipulates the switches S1, S2, S3, S4 in an alternate manner to generate the AC voltage V6 during the positive half-cycles and the negative half-cycles.

When the commercial power supply 50 is operating normally, the CPU manipulates the first switch circuit 41 to be connected to the commercial power supply 50, so that the AC voltage Vin is delivered to the load 33 and the first winding N1 of the transformer 22. That is, the voltage V1 across the first winding N1 is identical to the AC voltage Vin. The first winding N1 is configured as a primary winding, and the second winding N2, the third winding N3 are collectively configured as a secondary winding assembly. The AC voltage Vin received by the first winding N1 is transferred to the secondary winding assembly through electromagnetic action in order to produce an output voltage V2 across the second winding N2 and produce an output voltage V3 across the third winding N3.

The second winding N2 is provided with the capability of automatic voltage adjustment that can adjust the voltage Vout delivered to the load 51 according to the connection status between the second winding N2 and the second switch circuit 42. This would avoid the bad power supply on the load 33 due to the under/over voltage condition occurred to the voltage Vout delivered to the load 51. For example, when the AC voltage Vin exceeds the operative voltage specified to the load 51, the CPU allows the connection between the second switch circuit 42 and the second winding N2 to have a subtractive sense, so that the voltage Vout delivered to the load 51 is the difference of the input AC voltage Vin and the voltage V2 across the second winding N2. In this manner, the voltage delivered to the load 51 will not exceed the operative voltage specified by the load 33. It is to be noted that the second winding N2 is an optional element.

When the input AC voltage Vin is lower than the operative voltage specified by the load 51, the CPU allows the connection between the second switch circuit 42 and the second winding N2 to have an additive sense, so that the output voltage Vout delivered to the load 51 is the sum of the input AC voltage Vin and the voltage V2 across the second winding N2. In this manner, the voltage delivered to the load 51 will not be lower than the operative voltage specified to the load 51. When the AC voltage Vin complies with the operative voltage specified by the load 51, the CPU allows the connection between the second switch circuit 42 and the second winding N2 to be inactive, so that the voltage Vout delivered to the load 33 is identical to the AC voltage Vin.

An operating mode for charging the energy accumulation device 47 is described as follows. The voltage V3 outputted by the third winding N3 is converted by the rectifier 44 into a DC voltage. The DC voltage is delivered to the filter bank 461 through the choke coil L and the high-frequency harmonics of the DC voltage are removed by the filter bank 461. Thus, a stable DC voltage V4 is obtained. In order to allow the DC voltage generated by the rectifier 44 to be delivered to the energy accumulation device 47 for charging, the CPU manipulates the energy recycle circuit 451 to turn off (or switching turn on-off) so as to allow the DC voltage to be delivered to the filter bank 461.

When the CPU detects that the energy accumulation device 47 is fully charged, the CPU manipulates the switch 463 to turn on so that the DC voltage V4 is delivered to the ground terminal through the voltage regulator 462 and the switch 463 without charging the energy accumulation device 47. On the contrary, the CPU manipulates the switch 463 to turn off so that the DC voltage V4 is delivered to the energy accumulation device 47 through the voltage regulator 462 and the current-limiting circuit 464 for charging until the energy accumulation device 47 is fully charged.

When the commercial power supply 50 can not operate normally, the CPU manipulates the first switch circuit 41 to turn off and allows the energy accumulation device 47 to provide power. The DC-DC converter 48 boosts the DC voltage V5 outputted from the energy accumulation device 47, and the boosted DC voltage outputted from the DC-DC converter 48 is converted by the inverter 49 into an AC voltage V6. The AC voltage V6 is delivered to the first winding N1 so that the voltage V1 across the first winding N1 is identical to the AC voltage V6. For example, when the AC voltage V6 exceeds the operative voltage specified by the load 51, the CPU allows the connection between the second switch circuit 42 and the second winding N2 to have a subtractive sense, so that the voltage Vout delivered to the load 51 is the difference of the AC voltage V6 and the voltage V2 across the second winding N2. In this manner, the voltage delivered to the load 51 will not exceed the operative voltage specified by the load 33.

When the AC voltage Vin is lower than the operative voltage specified by the load 51, the CPU allows the connection between the second switch circuit 42 and the second winding N2 to have an additive sense, so that the output voltage Vout delivered to the load 51 is the sum of the input AC voltage Vin and the voltage V2 across the second winding N2. In this manner, the voltage delivered to the load 51 will not be lower than the operative voltage specified by the load 51. When the AC voltage Vin complies with the operative voltage specified by the load 51, the CPU allows the connection between the second switch circuit 42 and the second winding N2 to be inactive, so that the voltage Vout delivered to the load 33 is identical to the AC voltage Vin.

Figure 3C:
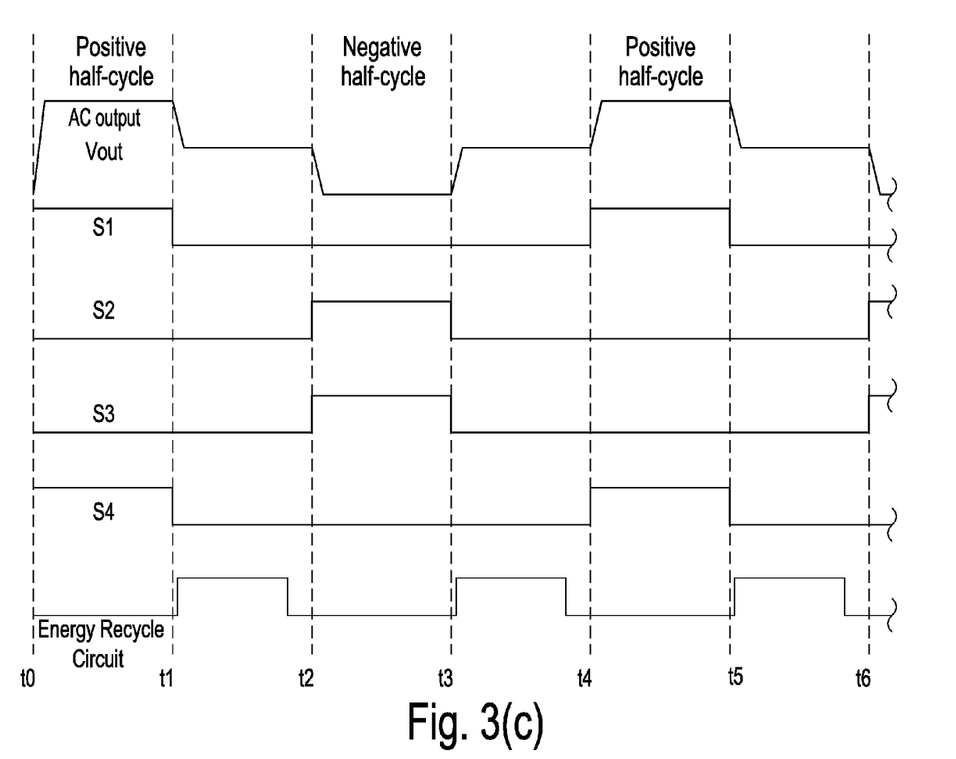
FIG. 3(c) shows a timing diagram illustrating a switching sequence of the energy recycle circuit and the switches S1, S2, S3, S4 within in the inverter.
Figure 3D:
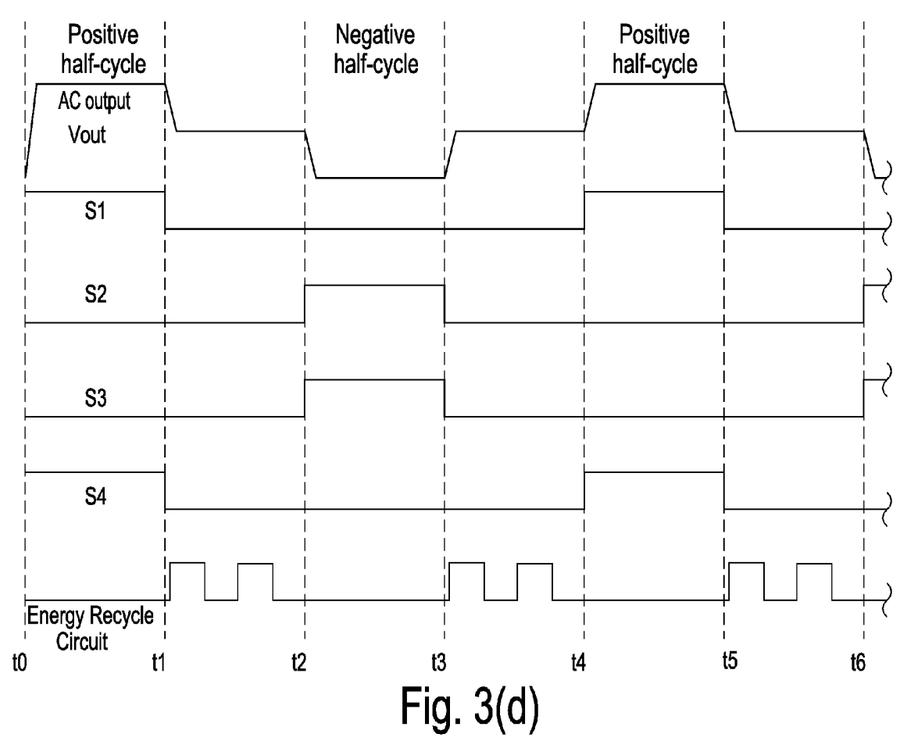
FIG. 3(d) shows a timing diagram illustrating another switching sequence of the energy recycle circuit and the switches S1, S2, S3, S4 within in the inverter.

In the present embodiment, the internal switches S1, S2, S3, S4 of the inverter 49 also provide an alternate switching mechanism in the positive half-cycles and the negative half-cycles. For example, the switches S1 and S4 are turned on and the switches S2 and S3 are turned off during the positive half-cycle of t0 to t1, and the switches S1 and S4 are turned off and the switches S2 and S3 are turned on during the negative half-cycle of t2 to t3, as shown in FIGS. 3(c) and 3(d). Therefore, an AC voltage Vout is generated. Because the inverter 49 provides an alternate switching mechanism in the positive half-cycles and the negative half-cycles to generate the AC voltage Vout, the voltage level of the AC voltage Vout at the time interval between the positive half-cycle and the negative half-cycle have to be zeroed voltage level (without DC value) so as to minimize the switching loss of the inverter 49. However, the switch mechanism of the internal switches S1, S2, S3, S4 of the inverter 49 allows the capacitive element 512 of the load 51 to be charged and discharged during each half-cycle, the capacitive element 512 will have residue electric energy during the time interval between the positive half-cycle and the negative half-cycle. Thus, the AC voltage Vout can not be zeroed under this condition. Therefore, under the mode that the energy accumulation device 47 is supplying power, the residue energy of the load capacitor 512 is coupled to the first winding N1 and discharged to ground through the third winding N3 by electromagnetic induction according to the connection status of the energy recycle circuit 451. In this manner, the discharging voltage of the load capacitor 512 of the load 51 can be discharged to ground or transferred to the energy accumulation for charging. The switching mechanism of the energy recycle circuit 451 can be conducted by two different means. Next, the switching mechanism of the energy recycle circuit 451 will be discussed with reference to the timing diagrams of FIG. 3(c) and FIG. 3(d).

Referring to FIG. 3(c), a timing diagram showing the switching sequence of the switches S1, S2, S3, S4 and the energy recycle circuit is illustrated. As shown in FIG. 3(c), during the time interval between the positive half-cycle and the negative half-cycle, that is, t1-t2, t3-t4 and t5-t6, the CPU will send control signals to turn off the switches S1, S2, S3, S4 of the inverter 49 and turned on the energy recycle circuit 451. Because the switches S1, S2, S3, S4 are all turned off during these periods, the drawback encountered by the prior art that the discharging voltage of the capacitive element 512 of the load 51 arises the temperature of the switches S1, S2, S3, S4 can be eliminated. More advantageously, the efficiency of the inverter can be enhanced and spikes occurred to the output voltage of the first winding N1 at the instant that the status of the internal switches of the inverter transits from turn-on to turn-off can be removed.

In addition, when the CPU turns on the energy recycle circuit 451, a loop will be formed between the load 51 and the first winding N1 of the transformer 43, so that the residue energy of the load capacitor 512 of the load 51 can be transferred to the first winding N1 and the discharging voltage of the load capacitor 512 can be converted by the third winding N3 into a AC voltage with a lower voltage level. The AC voltage generated by the third winding N3 is rectified by the rectifier 44 into a DC voltage which is transferred to the ground terminal 452 through the energy recycle circuit 451 for discharging. Therefore, the voltage level of the AC voltage Vout during the time interval between the positive half-cycle and the negative half-cycle can be zeroed, and the switching loss of the inverter 49 can be reduced.

Referring to FIG. 3(d), another timing diagram showing the switching sequence of the switches S1, S2, S3, S4 and the energy recycle circuit is illustrated. As shown in FIG. 3(d), during the time interval between the positive half-cycle and the negative half-cycle, that is, t1-t2, t3-t4 and t5-t6, the CPU will send control signals to turn off the switches S1, S2, S3, S4 of the inverter 49. The energy recycle circuit 451 will be turned on and off alternately. Because the switches S1, S2, S3, S4 of the inverter 49 are all turned off during these periods, the drawback encountered by the prior art that the discharging voltage of the capacitive element 512 of the load 51 arises the temperature of the switches S1, S2, S3, S4 can be eliminated. More advantageously, the efficiency of the inverter can be enhanced and spikes occurred to the output voltage of the first winding N1 at the instant that the status of the internal switches of the inverter transits from turn-on to turn-off can be removed.

In addition, the CPU manipulates the energy recycle circuit 451 to turn on and off alternately during the time interval between the positive half-cycle and the negative half-cycle. When the energy recycle circuit 451 is turned on, a loop is formed between the load 51 and the first winding N1, so that the discharging voltage of the capacitive element 512 of the load 51 can be transferred to the first winding N1 and the third winding N3 can convert the residue voltage into a DC voltage having a lower voltage level. The DC voltage having a lower voltage level is rectified by the rectifier 44 into a positive voltage. The choke coil L is configured to stored energy for enhancing the performance of energy recycling. The DC voltage outputted from the rectifier 44 can be transferred to the filter bank 461 in response to the turn-off of the energy recycle circuit 451. The filtered DC voltage is processed by the voltage regulator 462 and the current-limiting device 464 and the resultant voltage is used for charging the energy accumulation device 47. In this manner, the discharging voltage of the capacitive element 512 of the load 51 can be recycled to the energy accumulation device 47. The voltage level of AC voltage Vout during the time interval between the positive half-cycle and the negative half-cycle can be zeroed, thereby ensuring the normal operation of the inverter 49.

When the commercial power supply 50 can not operate normally and the energy accumulation device 47 is supplying power in the inventive uninterruptible power supply, the DC voltage V5 outputted from the energy accumulation device 47 has to be boosted by the DC-DC converter 48 and then converted by the inverter 49 into an AC voltage V6. The inverter 49 is connected to a voltage input terminal of the first winding N1 and thus is not necessary to be boosted by the transformer 43. Therefore, the fourth winding N4 of the transformer 43 does not need to be manufactured by copper wires with a larger thickness according to the present invention. Furthermore, the transformer can be downsized and the efficiency of the uninterruptible power supply can be enhanced.

It is noteworthy that the voltage regulator 462 and the current-limiting device 464 are optional elements. As shown in FIG. 3(a), the second winding N2 which can be used to regulate the voltage Vout has a unitary turn number. However, the second winding N2 can be constituted by transformer windings having different turn number, and the voltage level of the output voltage V2 can be regulated through the connection status between the second winding N2 and the second switch circuit 42 so as to broaden the range of the voltage to be delivered to the load 51. For example, the second winding N2 can be constituted by a transformer winding having a turn number of 3 and a transformer winding having a turn number of 6. When the second switch circuit 42 is switched to be connected across the transformer winding having a turn number of 3, the second winding N2 will output a voltage having a voltage level of A. When the second switch circuit 42 is switched to be connected across the transformer winding having a turn number of 6, the second winding N2 will output a voltage having a voltage level of 2A. When the second switch circuit 42 is switched to be connected across the transformer winding having a turn number of 3 and the transformer winding having a turn number of 6, the second winding N2 will output a voltage having a voltage level of 3A. Therefore, the second winding can output a voltage having a wide range of voltage levels. It is to be noted that the second winding N2 is also an optional element.

In conclusion, the inventive uninterruptible power supply can transferred the discharging voltage of the capacitive element of the load to the third winding of the transformer by electromagnetic induction through the first winding of the transformer, and release the voltage induced across the third winding through the energy recycle circuit or recycle he voltage induced across the third winding to the energy accumulation device for charging. Therefore, the energy dissipation caused by the switching operations of the switches of the inverter can be suppressed, and the efficiency of the inverter can be enhanced. Furthermore, under the mode that the energy accumulation device is supplying power, the voltage outputted from the energy accumulation device can be boosted by the DC-DC converter, thereby minimizing the turn number of the transformer and downsizing the transformer and enhancing the overall efficiency of the uninterruptible power supply.

While the present invention has been described in terms of what are presently considered to be the most practical and preferred embodiments, it is to be understood that the present invention need not be restricted to the disclosed embodiment. On the contrary, it is intended to cover various modifications and similar arrangements included within the spirit and scope of the appended claims which are to be accorded with the broadest interpretation so as to encompass all such modifications and similar structures. Therefore, the above description and illustration should not be taken as limiting the scope of the present invention which is defined by the appended claims.

What is claimed is:

1. An uninterruptible power supply connected to a commercial power supply and a load having a capacitive element, comprising:
   a controller;
   a first switch circuit connected to the commercial power supply and the controller;
   a second switch circuit connected to the controller and one end of the load for performing a switching operation in response to the driving of the controller;
   a transformer having a first winding, a second winding, and a third winding, wherein the first winding is connected to the other end of the load and the first switch circuit and the second switch circuit, and wherein the second winding is connected to the second switch circuit;
   a charging circuit connected to the third winding;
   an energy accumulation device connected to the charging circuit;
   a DC-DC converter connected to the energy accumulation device for boosting a DC voltage outputted from the energy accumulation device; and
   an inverter connected to the first winding and the DC-DC converter for converting a boosted DC voltage outputted from the DC-DC converter into a first AC voltage and delivering the first AC voltage to the load;
   wherein when the energy accumulation device is supplying power, the controller manipulates the first switch circuit to turn off and a second AC voltage is induced in the second winding in response to the first AC voltage which is delivered to the first winding, such that the second AC voltage regulates a voltage level of the first AC voltage according to a connection status between the second switch circuit and the second winding.

2. The uninterruptible power supply according to claim 1 wherein the energy accumulation device is a battery and the controller is a central processing unit.

3. The uninterruptible power supply according to claim 1 wherein the charging circuit comprises a rectifier, an energy recycle circuit, a ground terminal, a choke coil and a filter/regulator circuit for charging the energy accumulation device with an AC voltage outputted from the third winding.

4. The uninterruptible power supply according to claim 3 wherein the rectifier is connected to the third winding for converting the AC voltage outputted from the third winding into a DC voltage, and wherein the rectifier comprises:
   a first diode having an anode connected to one end of the third winding;
   a second diode having an anode connected to the other end of the third winding and a cathode connected to a cathode of the first diode.

5. The uninterruptible power supply according to claim 4 wherein the filter/regulator circuit comprises a filter bank for removing high-frequency harmonics from the DC voltage.

6. The uninterruptible power supply according to claim 3 wherein the filter/regulator circuit further comprises a voltage regulator and a switch, and wherein the voltage regulator is connected to the filter bank and the switch for regulating a voltage inputted into the energy accumulation device according to a status of the switch, and wherein the switch is manipulated by the controller.

7. The uninterruptible power supply according to claim 6 wherein the filter/regulator further includes a current-limiting device being connected to the voltage regulator and the energy accumulation device for limiting a charging current of the energy accumulation device.

8. The uninterruptible power supply according to claim 3 wherein the inverter provides an alternate switching mechanism to convert the DC voltage outputted from the DC-DC converter into an AC voltage and delivers the AC voltage to the first winding.

9. The uninterruptible power supply according to claim 3 wherein the energy recycle circuit is a switch being connected to the rectifier and the filter/regulator circuit for performing a switching operation under the manipulation of the controller.

10. The uninterruptible power supply according to claim 9 wherein when the energy accumulation device is supplying power, a residue voltage of the capacitive element of the load is transferred to the first winding of the transformer so as to induce an AC voltage across the third winding of the transformer.

11. The uninterruptible power supply according to claim 10 wherein the switch is manipulated by the controller to be connected to the ground terminal during the time intervals between the positive half-cycles and the negative half-cycles of the first AC voltage, such that the AC voltage induced across the third winding of the transformer is released through the rectifier and the switch.

12. The uninterruptible power supply according to claim 10 wherein the switch is manipulated by the controller to turn on and off during the time intervals between the positive half-cycles and the negative half-cycles of the first AC voltage, such that the AC voltage induced across the third winding of the transformer is processed by the rectifier and the filter/regulator circuit for charging the energy accumulation device and recycling a discharging voltage of the capacitive element of the load to the energy accumulation device.

13. An uninterruptible power supply connected to an input power supply and a load having a capacitive element, comprising:
   a ground terminal;
   an energy accumulation device;
   a DC-DC converter connected to the energy accumulation device;
   a controller for generating a control signal;
   a filter/regulator connected to the energy accumulation device;
   a transformer having a first winding, a second winding, and a third winding, wherein the first winding is connected to the load;
   a rectifier connected to the third winding of the transformer;
   an inverter connected to the first winding and the DC-DC converter; and
   an energy accumulation device connected to the rectifier, the controller, the ground terminal and the filter/regulator, and wherein when the energy accumulation device is supplying power, the energy accumulation device is turned on and off according to the control signal of the controller, such that a discharging voltage of the capacitive element of the load is delivered to the first winding of the transformer and thereby inducing a first voltage across the third winding of the transformer;

wherein the first voltage is discharged to the ground terminal through the rectifier and the energy accumulation device or processed by the rectifier and the filter/regulator for charging the energy accumulation device.

14. The uninterruptible power supply according to claim 13 further comprising a first switch circuit being connected to the input power supply and the controller, and wherein when the energy accumulation device is supplying power, the first switch circuit is manipulated by the controller to turn off.

15. The uninterruptible power supply according to claim 13 further comprising a second switch circuit being connected to the controller and one end of the load for performing a switching operation in response to the driving of the controller.

16. The uninterruptible power supply according to claim 13 wherein the energy accumulation device is a battery and the controller is a central processing unit.

17. The uninterruptible power supply according to claim 13 wherein the rectifier comprises:
- a first diode having an anode connected to one end of the third winding;
- a second diode having an anode connected to the other end of the third winding and a cathode connected to a cathode of the first diode.

18. The uninterruptible power supply according to claim 13 wherein the filter/regulator circuit includes a filter bank for removing high-frequency harmonics from a DC voltage outputted from the rectifier.

19. The uninterruptible power supply according to claim 18 wherein the filter/regulator circuit further comprises a voltage regulator and a switch, and wherein the voltage regulator is connected to the filter bank and the switch for regulating a voltage inputted into the energy accumulation device according to a status of the switch, and wherein the switch is manipulated by the controller.

20. The uninterruptible power supply according to claim 19 wherein the filter/regulator further includes a current-limiting device being connected to the voltage regulator and the energy accumulation device for limiting a charging current of the energy accumulation device.

* * * * *